Jan. 26, 1971   P. R. PAYNE ET AL   3,557,471
ANTHROPODYNAMIC DUMMY
Filed Sept. 16, 1968   3 Sheets-Sheet 3

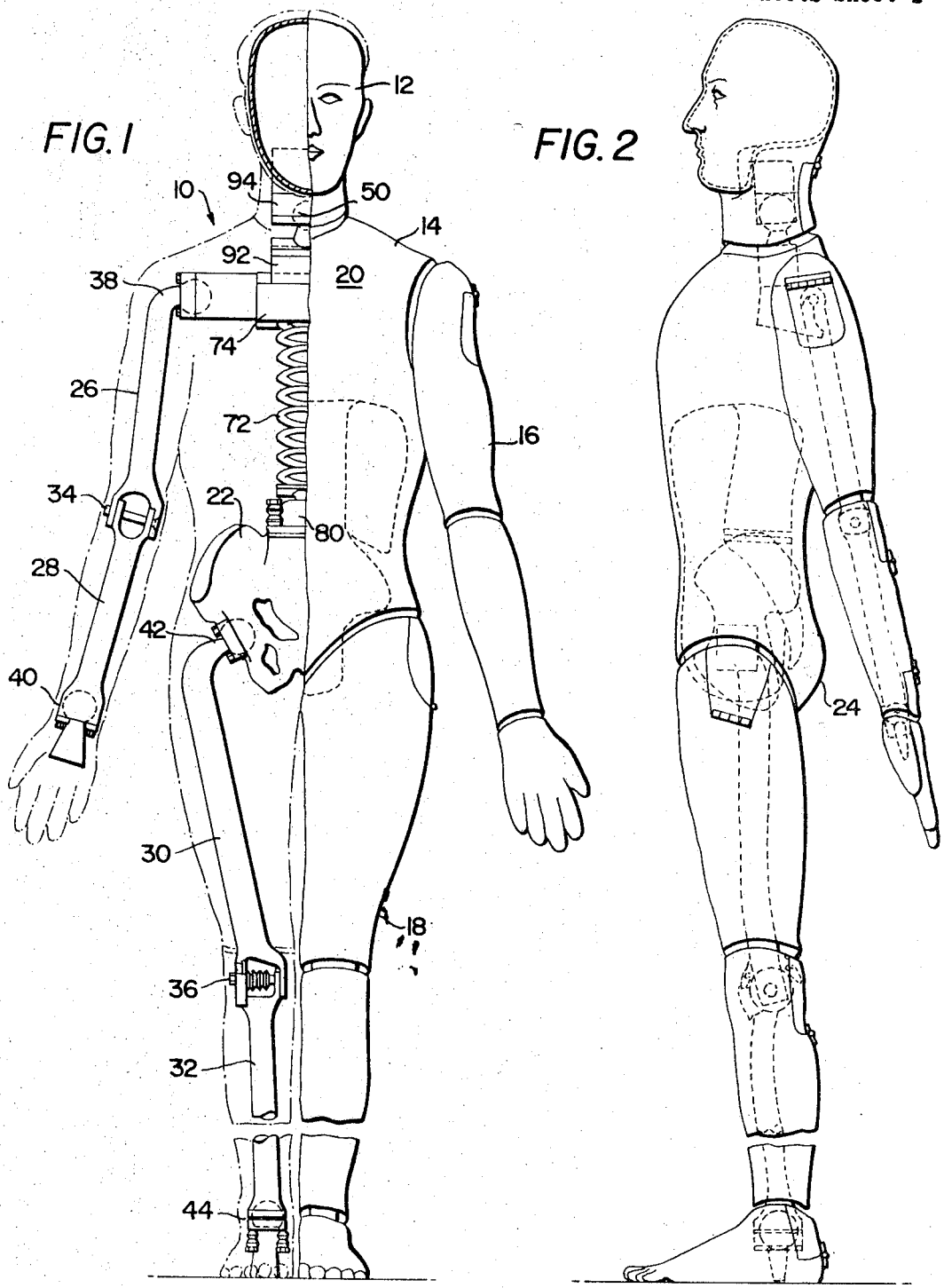

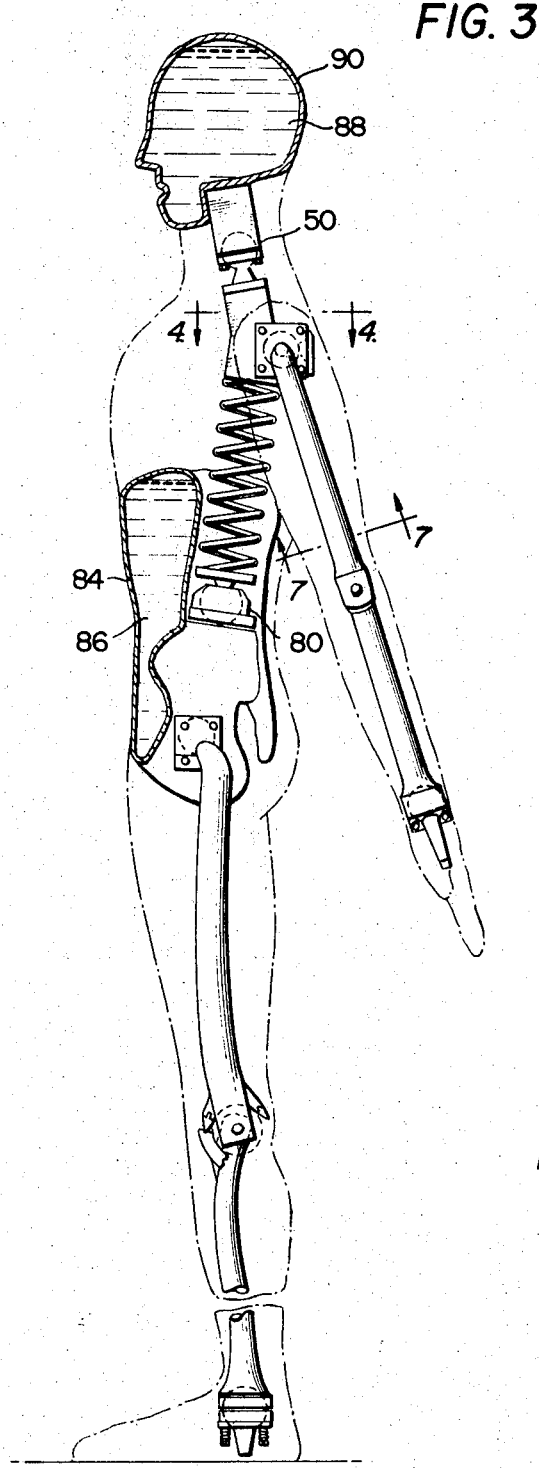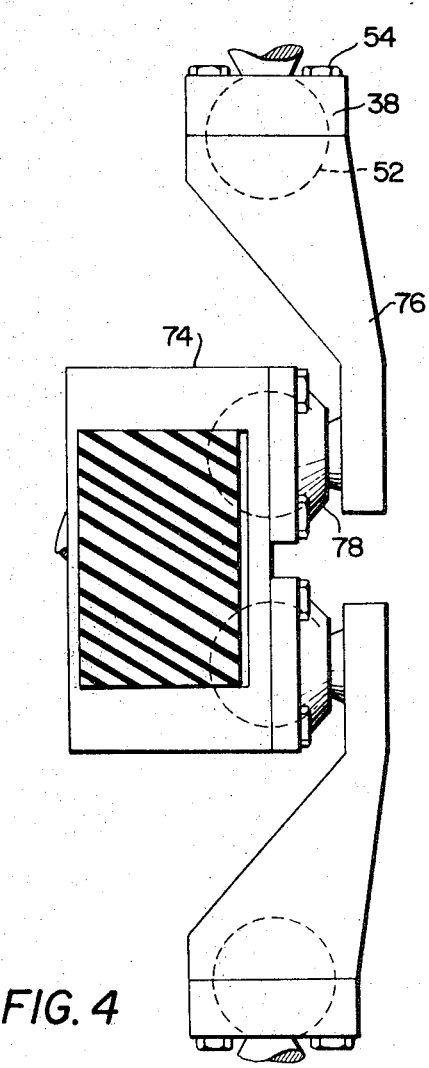

INVENTORS
STEPHEN J. CHRIS
PETER R. PAYNE

BY
ATTORNEYS

United States Patent Office 3,557,471
Patented Jan. 26, 1971

3,557,471
ANTHROPODYNAMIC DUMMY
Peter R. Payne, Rockville, and Stephen J. Chris,
Gaithersburg, Md., assignors to Wyle Laboratories
Filed Sept. 16, 1968, Ser. No. 759,958
Int. Cl. A63h 9/00
U.S. Cl. 35—17
9 Claims

ABSTRACT OF THE DISCLOSURE

A man model or dummy of the type utilized in tests to determine the survivability or injury of man under crash or crash ejection conditions incorporates structure to simulate the major dynamic characteristics of the human body. The dummy has a body with movable joints having adjustable restraint, a torso with longitudinal and transverse natural frequencies and limbs having bending and axial stiffnesses, all of which simulate a man.

BACKGROUND OF THE INVENTION

Field of the invention

This invention relates to man models or dummies and more particularly to an anthropodynamic dummy which simulates the major dynamic characteristics of the human body.

Description of the prior art

Various human equivalent dummies are known in the prior art having simulated bones and articulated joints. Such known dummies, however, are primarily for the purposes of simulating casualties or studying the effect of radiation. Dummies are also known for measuring, e.g. checking accommodations, particularly in vehicle seats. Thus, only anthropomorphic and anthropometric dummies are known at present.

There is a need in the art for dummies which can be utilized in tests to determine the survivability of man under various conditions such as would be encountered in crashes, ejections from crashes, etc. In such conditions it has been found that the dynamic response of the human body plays an important part of determining the size and locations of the loads imposed upon the body and its restraint system. However, there is nothing known in the art providing a dummy with a proper natural frequency which simulates the major dynamic charactesitics of the human body.

A considerable amount of testing is being undertaken for the protection of man under crash or crash escape conditions. It is essential, therefore, to establish engineering parameters of the environment and of man himself. A model or dummy man is a most useful tool but for meaningful tests such a dummy must simulate a man in such structural and dynamic terms as stiffness (modulus of elasticity×moment of inertial and bending members), viscosity, mass, mass distribution, yield or ultimate allowable tensile stress, column allowable stress, natural frequency and damping.

It is known that man's components, which do have elasticity and damping, are part of the total dynamic system which acts on other components. For this reason, any tests which apply dynamic loads to a simulated man must duplicate the dynamic elements in the system between the load application and the point where damage might be expected to occur. A simple illustration of this is the cushioning (absorption of energy) of a jump by flexing the knees followed by tightening of the leg muscles, thus protecting the legs and spine from damage. Man must, therefore, be considered in terms of his effect on the system and tolerance in terms of load, acceleration, etc.

SUMMARY OF THE INVENTION

This invention provides an anthropodynamic dummy which simulates the approximate natural frequencies, movement restraining forces of the limbs, joint movement limits, whether imposed by bone or muscle, bending stiffness of bones and, at the joint, a combination of bones, tendon and ligaments, etc.

This is achieved, in the present invention, by an anthropodynamic dummy having simulated joints restrained by adjustable means with suitable stops and generally articulating similar to equivalent human joints, and a torso having a longitudinal natural frequency of a human. The torso may utilize a tuneable spring in the place of a thoracic spinal column. The torso may have a liquid-filled bag portion shaped to simulate the transverse frequency of a human and to provide the proper mass. The bones of the limbs have appropriate stiffness and fuses or other measuring means can measure when the limbs and bones exceed the maximum load without incurring damage to the dummy.

BRIEF DESCRIPTION OF THE DRAWINGS

FIG. 1 is a front elevational view of the anthropodynamic dummy of this invention with a portion removed for the sake of clarity in illustration.

FIG. 2 is a side elevational view of the anthropodynamic dummy of FIG. 1.

FIG. 3 is a side elevational sectional view through the anthropodynamic dummy of FIG. 1.

FIG. 4 is a detailed sectional plan view taken along line 4—4 of FIG. 3.

DESCRIPTION OF THE PREFERRED EMBODIMENTS

Figure 5:
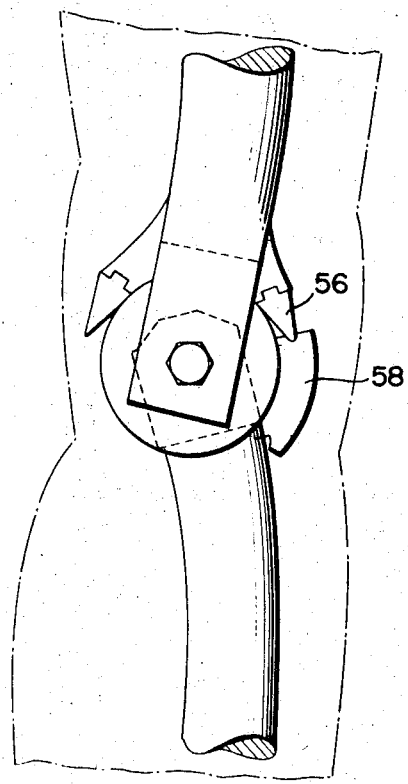
FIG. 5 is a detailed elevational view of a typical joint in the limbs.

An anthropodynamic model of man or dummy 10 is fabricated for example to a 95 percentile configuration of man as shown in FIGS. 1–3. Externally, for fitting of appropriate clothing which exerts a strong influence on aerodynamic drag forces, the dummy closely resembles human flesh contours. The overall dummy and each of the independent segments have a center of gravity and moment of inertia simulating an actual human.

The dummy 10 includes a head 12, a torso 14, arms 16, legs 18 and, as noted, a simulated skin surface 20 intended to be close to a 100% configuration of an actual man.

The bones of the body have been simplified for ease in fabrication since there is no necessity for duplicating the exact bone contours of a human except for a pelvic bone 22 which has an external shape, area distribution and stiffness to match the human counterpart. This is important since this bone affects the natural frequency of the combination of the trunk 20, buttocks 24 and seat cushion which provides correct loading of the cushion during ejection or downward inertia load. The buttocks may be double hemiellipsoids for the purpose of standarization of a key element of ejection seat tests.

The main compression members or bones 26, 28 in the arms 16 and bones 32 in the legs 18 have been simplified so that there is only one compression member or simulated bone in each portion of each limb.

The arms 16 and legs 18 have joints 34 and 36 of the clevis type at the elbow and knee, respectively, and ball and socket joints 38–40 at the shoulder and wrist and joints 42 and 44 at the hip and ankle. All of the major joints are simulated and arranged such that the members move with essentially the movement of the similar components of the human body. Minor joints, however, such as those in the hands and feet, may or may not be simulated since digital movements, for example, movements of the fingers, would have small effect on the damage to arms, legs and other parts of the body.

Figure 7:
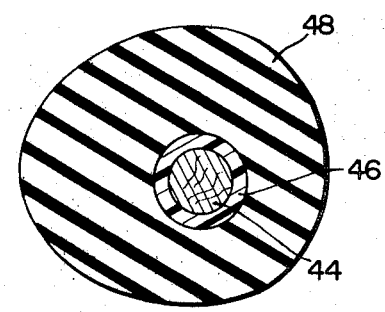
FIG. 7 is a sectional view taken through a typical limb on line 7—7 of FIG. 3.

The bones themselves are preferably of the type as shown in sectional view of FIG. 7 and are constructed from a core 44 of balsa wood or other similar soft and light material and a fiber glass reinforced plastic (such as epoxy) outer surface 46. The wood simulates the soft inner portion of a human bone and the outer fiber glass reinforced plastic represents the hard portions of human bone which provide nearly all the strength. The fiber glass reinforced plastic may be added as a hand layup and its thickness of composition may vary to simulate bone strength and/or stiffness. The fiber glass may be enclosed in a rubber mass 48 cast thereon and having a hardness which varies to simulate local stiffnesses. The bending modulus of elasticity (E value) for the outer portion of human bone is approximately $2.26 \times 10''$ dynes per square centimeter which is approximately the same as that for fiber glass reinforced epoxy. If it were desired to have the bones break, the strength of the glass reinforced plastic could be adjusted to provide a very close simulation. However, it could be preferable for most tests to have the bone of sufficient strength to withstand damage under conditions which would break the human bone and to measure the applied load rather than break the bone itself.

Preferably, all of the joints are of two main types for simplicity, the ball and socket joints, such as joints 38, 40, 42 and 44 as well as neck joint 50 constituting one type where motion is required in more than one plane and clevis joints such as joints 34 and 36 for single plane motion.

A typical ball and socket joint such as shoulder joint 38 shown in FIG. 4 has a large surface area of the ball 52 cooperating with a large area of the sockets providing large friction areas for non-stick-slip materials of known types. These materials are selected to duplicate the resistance achieved in various joints by the muscles in a human as he adjusts muscular tension for a particular situation. The adjustment may be accomplished with the switch of materials or by adjstment of the friction of the ball and socket joints, for example, by suitable screw means 54, see FIG. 4. Although a person's reaction may not be known in each case, a range from limp to rigid can be simulated. It is thus possible to bracket this parameter and show the extent to which it influences serious injury in crash environments.

The ball and socket joints may be provided with Belleville springs or equivalent for pressure uniformity under varying temperatures as shown for the ball-socket joint 44.

Figure 6:
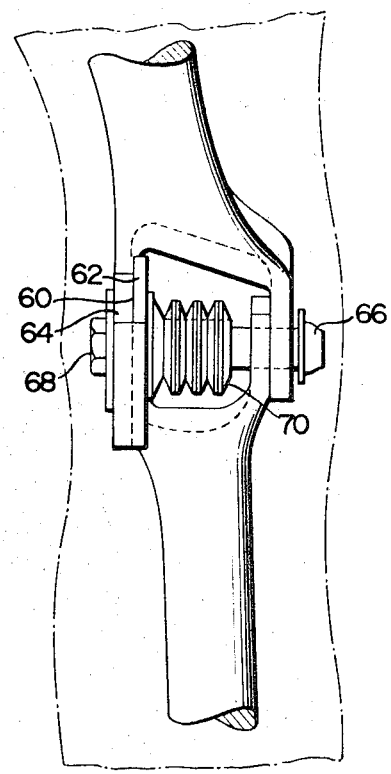
FIG. 6 is a front elevational view of the joint shown in FIG. 5.

The restraint of the clevis joint of FIGS. 5 and 6 is adjustable by providing an adjustable pressure friction or dampening area 60 between the face of a disc 62 and a member 64. The pressure on area 60 is adjusted by nut 66 on bolt 68 and is urged by a series of Belleville springs 70 or equivalent, for pressure uniformity under varying temperatures. The axis of bolt 68 is, of course, the pivotal axis of the joint and the restraint of the joint may be adjsted to simulate suitable conditions. The joint regions are either exposed for friction adjustment or covered with easily removable covers.

Angular limits of motion for the joints may be provided by lugs or tongues extending from each joint member which abut and are cushioned by plastic deformation of a calibrated expendable simulated cartilage. This simulation is a true one for many of the bone joints since, in a human, the cushion is a combination tendon, ligament and cartilage. Nevertheless, the plastic deforming material gives a simple, yet precise, means of measuring inertia loads at the limit of travel. Calibration of these plastic elements provides a measure of load with a very acceptable accuracy and this permits calibration of the range of stresses which might be inflicted upon live subjects under the same dynamic situation. Although all joints may have such movement limiting or measuring means, only one is shown for simplicity. A typical example is shown in FIG. 5 wherein a lug or tongue member 56 is adapted to abut into a plastic member 58 on movement of the joint to or beyond a predetermined limit. This tongue member could be calibrated to give way on the application of a predetermined force.

One of the most important parts of the body to simulate is the torso 20, especially form the standpoint of evaluating ejection. It is important that longitudinal natural frequency be near that of a human, i.e. 8.25 cycles per second. In the present invention the primary means of achieving this natural frequency is to insert a tuneable spring 72 as a thoracic spinal column. The spring is mounted at its upper end to a base block 74 which also forms an attachment for the cervical spine or neck and, in addition, supports pivots for those members 76 which simulate the scapulae or shoulder blades (alternately, may support the clavicles or collar bones), see FIG. 4, and is connected thereto by ball joints 78. The lower end of the thoracic spring 72 is attached to a pivot 80 located approximately in a position of lumbar vertebra 3 at the top of the simulated pelvic bone 22. This pivot 80 is of a ball and socket type permitting universal motion but only to appropriate limits in each direction.

In order to simulate motion of the shoulders, the simulated scapulae members 76 pivot about ball joints 78 in points at the rear of the base block 74 so that the outer extremities of each scapula can move in superior or inferior, as well as anterior and posterior directions, within the limits provided by the human body. The ball and socket joints 78 are located just off the sagittal plane.

The surface of the torso 20 is provided with rubber molded to the proper flesh contour with hollows as required to produce the proper natural transverse frequency of 7 to 8 cycles per second. The upper or thoracic region will be hollow or it can be filled with soft sponge as required to achieve the effect of the lung cavity. The lower or abdominal cavity will be filled with a liquid, such as water 86 in bag 84, which has essentially the desired characteristics, not only to produce the proper natural frequencies, but also to provide the proper weight distribution and inertia effects as occasioned by shifts in position from rapid flexure of the spine. The diaphragm at the upper end of the abdominal cavity will also be simulated.

Similarly, the head 12 may be filled with water 88 which may be removed during transportation of the dummy. The head outer surface may be a fiber glass reinforced plastic skull 90 with its thickness and composition varied to produce the correct frequency and/or strength simulating a human's.

The cervical spine or neck is simulated by the ball and socket joint 90 with universal motion within appropriate limits and each end bonded to a rubber block such as blocks 92 and 94. These blocks permit limited elongation similar to that which would occur during stretching of a human neck vertebrae joint. The skull 90 may be covered with a light synthetic skin to encase it and simulate the cushioning effect of human skin.

The dummy may be fitted with suitable instrumentation in addition to the injury calibration fuse 56. Such instrumentation is not, however, shown for the sake of simplicity but can include accelerometers and rate gyros for the major portion of the torso, pressure transducers in the head and abdominal cavities, and calibrated slugs or plates which plastically deform or crush under load applied to measure bending moments in the limbs under normal conditions. Strain gauges can be applied to the simulated bones. If desired to make part of the anthropodynamic dummy X-ray opaque or provide X-ray density to facilitate accurate attitude photography in what otherwise might be a non-reflective body, small pieces of metal foil or equivalent may be inserted in bone extremities or provided in suitable clothing.

As can be seen, this invention provides a relatively simple anthropodynamic man model which is not only dynamically similar, but also has likeness in size, weight and weight distribution. All of the major joints are simulated in a manner which provides movement and movement restraints closely approximating a human and the model is thus extremely useful in determining dynamic response of the human body in crash and crash ejection environments.

What is claimed is:

1. An anthropodynamic dummy simulating the major dynamic characteristics of a human and having a simulated body with a torso, limbs with simulated bones, and major body joints, comprising; the simulated bones having a natural frequency and stiffness simulating a human, the simulated joints being restrained, and the torso having means to simulate the natural longitudinal frequency of a human body.

2. An anthropodynamic dummy as in claim 1 wherein the restraint of the simulated joints is adjustable and stops are provided at normal limits of joint movement.

3. An anthropodynamic dummy as in claim 2 wherein the stops include a precalibrated deformable member which will deform when the load applied at the limits of joint movement reaches predetermined amounts.

4. An anthropodynamic dummy as in claim 1 further comprising a liquid containing skull and a portion of the torso containing liquid to simulate natural frequency of man.

5. An anthropodynamic dummy as in claim 4 wherein the liquid in the torso is contained in a bag shaped to simulate the transverse natural frequency of a human body.

6. An anthropodynamic dummy as in claim 1 including a tuneable spring simulating a thoracic spinal column.

7. An anthropodynamic dummy as in claim 6 further comprising resilient blocks bonded to the upper and lower ends of the thoracic column for a frequency control and limited elongation.

8. An anthropodynamic dummy as in claim 2 wherein the adjustable restraint is applied through Belleville springs to provide uniformity of pressure at varying temperatures.

9. An anthoropodynamic dummy as in claim 1 wherein the simulated bones have a soft core encased in fiber glass reinforced plastic.

References Cited

UNITED STATES PATENTS

| 1,868,049 | 7/1932 | Deichmann | 46—161 |
| 2,472,819 | 6/1949 | Giesen | 35—17 |
| 2,760,303 | 8/1956 | Del Mas | 46—161X |
| 3,357,610 | 12/1967 | Quinby, Jr. | 46—161X |

FOREIGN PATENTS

| 567,224 | 12/1932 | Germany | 35—17 |
| 465,569 | 9/1951 | Italy | 46—161 |

OTHER REFERENCES

"Remab-Remcal," Alderson Research Lab, Inc. Bulletin No. 30, received Sept. 27, 1960.

LOUIS G. MANCENE, Primary Examiner

D. L. WEINHOLD, JR., Assistant Examiner

U.S. Cl. X.R.

46—156